Feb. 27, 1945.  H. M. DODGE  2,370,294
MOLDING APPARATUS FOR MAKING THIN-WALLED HOLLOW ARTICLES
Original Filed April 25, 1941  4 Sheets-Sheet 4

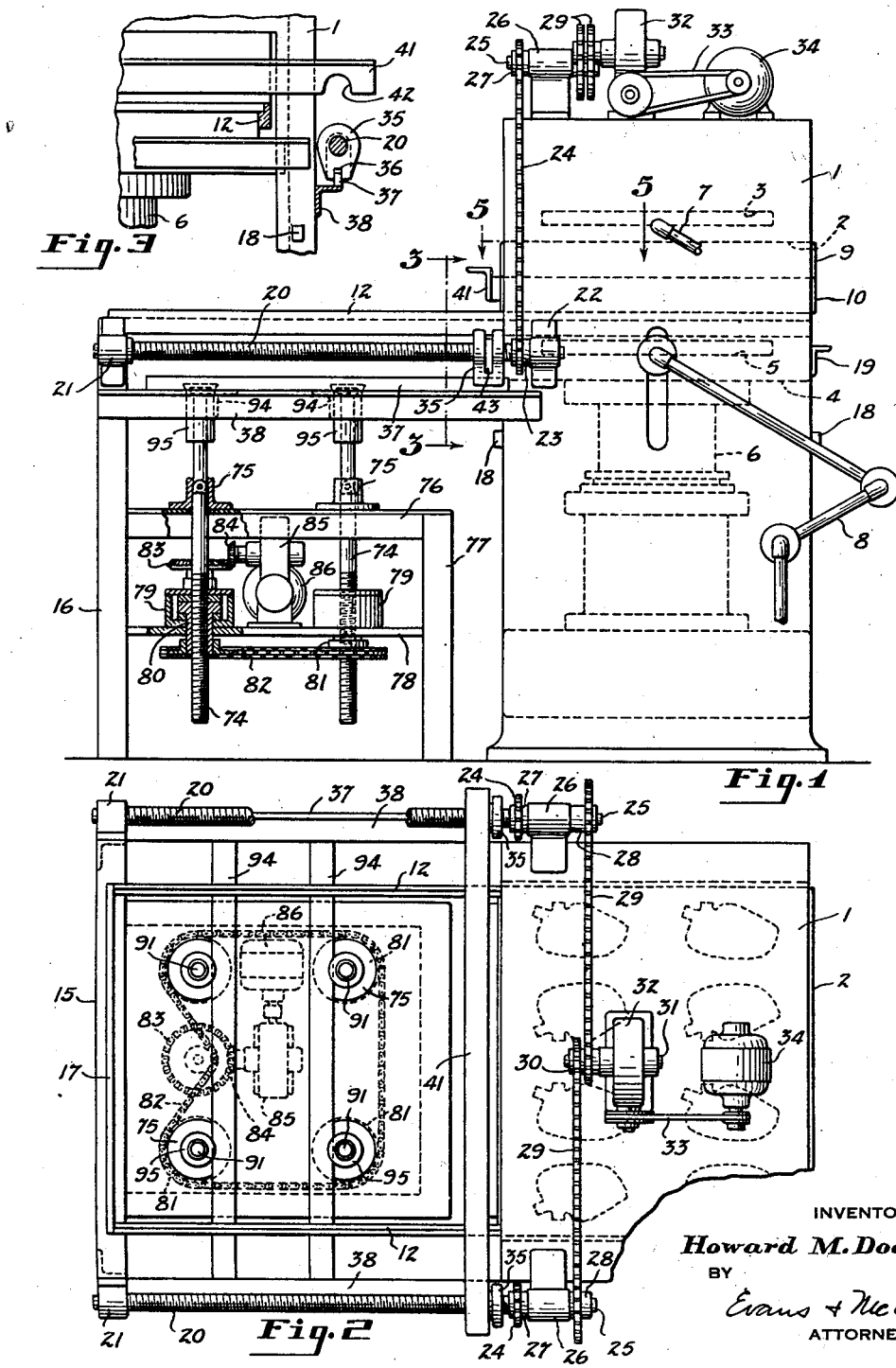
Feb. 27, 1945.     H. M. DODGE     2,370,294
MOLDING APPARATUS FOR MAKING THIN-WALLED HOLLOW ARTICLES
Original Filed April 25, 1941     4 Sheets-Sheet 1
INVENTOR
*Howard M. Dodge*
BY
*Evans + McCoy*
ATTORNEYS INVENTOR
Howard M. Dodge
BY
Evans + McCoy
ATTORNEYS

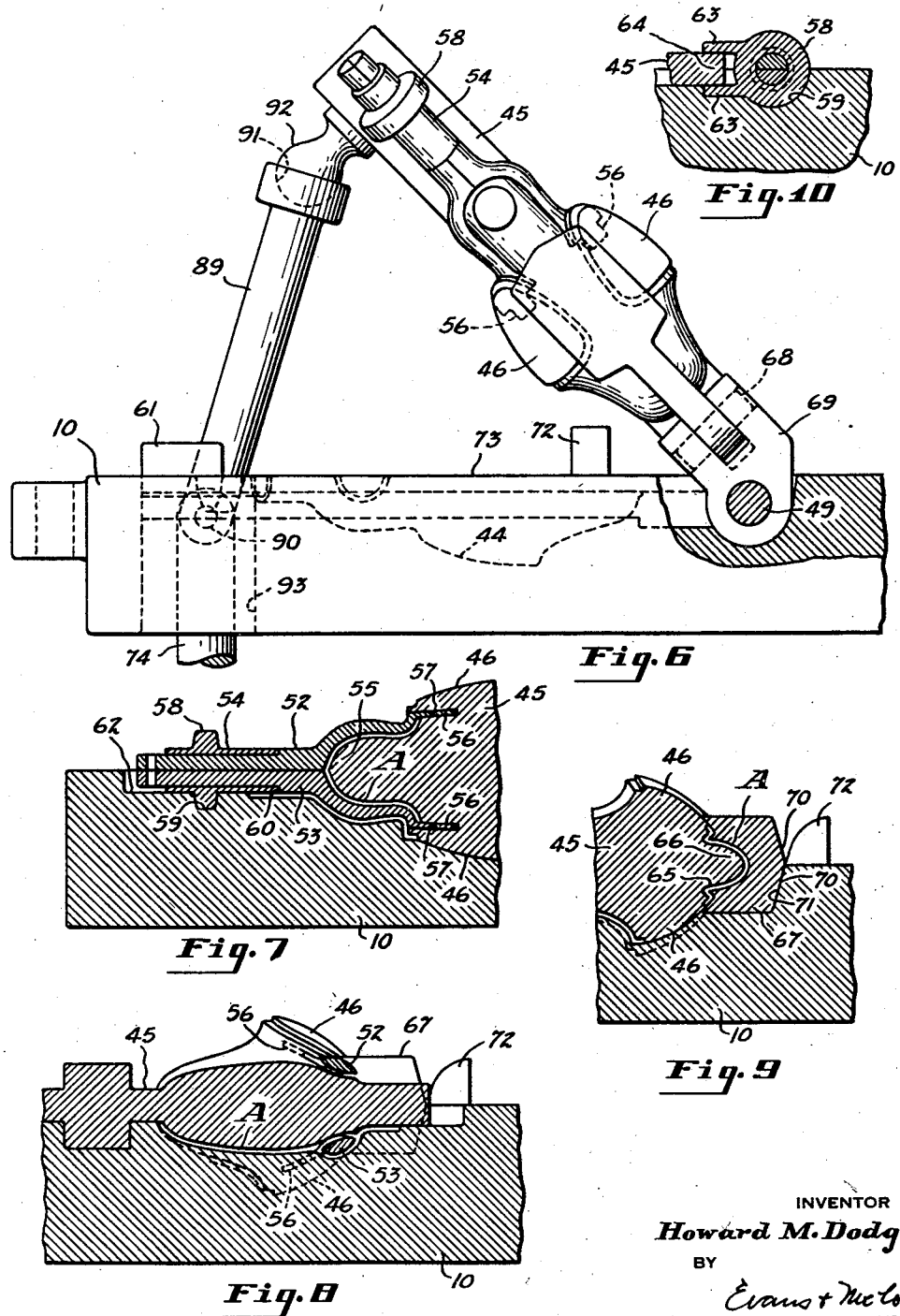

INVENTOR
Howard M. Dodge
BY
Evans & McCoy
ATTORNEYS

Patented Feb. 27, 1945

2,370,294

UNITED STATES PATENT OFFICE 2,370,294

MOLDING APPARATUS FOR MAKING THIN-WALLED HOLLOW ARTICLES

Howard M. Dodge, Wabash, Ind., assignor to The General Tire & Rubber Company, Akron, Ohio, a corporation of Ohio Original application April 25, 1941, Serial No. 390,276. Divided and this application February 6, 1943, Serial No. 474,942

7 Claims. (Cl. 18—35)

This invention relates to molding apparatus, and more particularly to apparatus of such character for use in making thin hollow articles such as blanks for face or gas masks and the like of soft resilient composition material such as rubber, and is a division of my co-pending application, Serial No. 390,276, filed April 25, 1941.

Molds for making rubber masks are usually of the separable section type wherein a molding cavity is formed in the meeting faces of complemental mold sections and a core is provided to cooperate with the molding cavity in forming the face blank. The present invention has for its general object the improvement in molding apparatus of the type mentioned including improved means for moving one of the mold sections into and out of the press in which the molding and curing takes place, improved means for moving or withdrawing the core members from the mold cavities, means for molding air passages in the walls of face blanks through which inhalation air may be conducted directly to the eye pieces of the mask when the same is being worn, and a relatively small supplemental mold section wholly receivable within and movable relative to the separable mold sections and cooperable therewith for forming re-entrant frontal surface portions of the face blank.

A further and more specific object of the invention is to provide in a mold for rubber face blanks improved core means including a removable yoke which straddles the main core member and has connection with the latter to form air passages in the walls of the face blanks that lead to the eye pieces of the finished face blank.

Another object is to provide molding apparatus for making face blanks which is simple in design and construction and relatively inexpensive to manufacture and in which a multiplicity of uniform face blanks having smooth face conforming curves may be quickly and economically manufactured. Other objects and advantages will become apparent from the following detailed description of suitable embodiments of the invention made in connection with the accompanying drawings, in which:

Figure 1 is an elevational view, partly in section and with parts removed, showing a molding press and associated mold sections and parts for simultaneously shaping and curing a plurality of face blanks for gas masks and embodying the principles of the present invention;

Fig. 2 is a plan view, with parts removed and with parts broken away, of the apparatus shown in Fig. 1;

Fig. 3 is a fragmentary detail in section taken substantially on the line 3—3 of Fig. 1;

Fig. 6 is a fragmentary elevational view, partly in section and with parts broken away, showing a portion of one of the main core members with the yoke element and the supplemental mold section associated therewith;

Fig. 7 is a sectional detail through the yoke element taken substantially on the line 7—7 of Fig. 5;

Fig. 8 is a sectional detail through the main core member and yoke element taken substantially on the line 8—8 of Fig. 5;

Fig. 9 is a sectional detail showing the supplemental core piece and taken substantially on the line 9—9 of Fig. 5;

Fig. 10 is a sectional detail showing the means for interlocking the main core member and the yoke element and taken substantially on the line 10—10 of Fig. 5;

Figure 4:
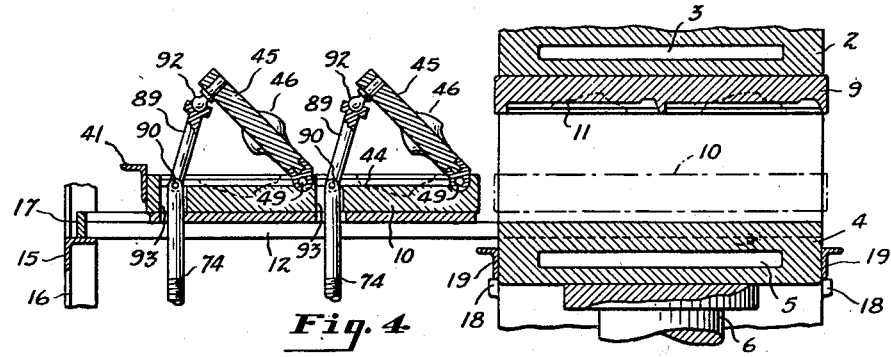
Fig. 4 is a fragmentary vertical sectional view through the above molding apparatus showing the bottom mold section withdrawn from the press and the core members elevated out of the molding cavities.

Referring to the drawings by numerals of reference which indicate like parts throughout the several views, the principles of the invention are illustrated as applied to or incorporated in a molding press 1 which may be of conventional construction and which includes a fixed platen or upper stationary member 2 having a steam chamber 3 and a lower or movable platen 4 having a steam chamber 5. The movable platen 4 is suitably guided in the frame structure of the press 1 and is actuated by a vertically reciprocable ram 6 that may be energized hydraulically or pneumatically in accordance with well known practice to raise and lower the movable platen 4. Suitable conductors, indicated at 7 and 8, respectively, supply heating steam to the chambers 3 and 5 of the platens 2 and 4, respectively.

The article or face blank to be molded is shaped in a suitable, continuous cavity A cooperatively formed or recessed in the meeting faces of separable mold sections 9 and 10. The upper mold section 9 is secured to the under side of the fixed or upper platen 2 with the cavity surfaces indicated at 11 facing downwardly. The lower or movable mold section 10 is slidably mounted on tracks 12 carried by the bottom or movable platen 4 so that the lower mold section can be slid into and out of the press 1 as desired. These tracks, supported cantilever fashion by the platen, are disposed in spaced parallel relation to one another and are so secured to the movable platen 4 as to be raised and lowered therewith. When the platen 4 is in lowered position the outer ends of the rails 12 rest upon and are supported by a cross member 15 carried by uprights 16 of a framework that carries the actuating mechanism for moving the bottom mold section 10 into and out of the press and for raising and lowering the core pieces, as will later appear. If desired, a cross member 17 may be secured between the ends of the tracks 12. The lower limit of movement of the platen 4 is determined by lugs or bosses 18 on the sides of the press which engage the underside of cross members 19 secured to the platen 4, as the latter is lowered.

To move the bottom mold section 10 into and out of the press on the tracks 12, spaced parallel threaded rods or screws 20 are journalled in bearings 21 and 22 secured to the top of the frame uprights 16 and to the press 1, respectively. On the ends of the rods 20 adjacent the press 1 are secured sprockets 23, around which are trained endless chains 24 which extend upwardly and are trained around sprockets 27 secured on stub shafts 25 journalled in bearings 26 on the top of the press. The shafts 25 have sprockets 28 secured thereon, driven by chains 29 that extend to a double sprocket 30 secured on shaft 31 of a speed reducer 32. This speed reducer is driven by a belt or chain 33 connected to a reversible electric drive motor 34. As shown in Fig. 1, the speed reducer 32 and the motor 34 may be mounted on top of the press 1 and suitable controls for energizing the motor 34 for forward and reverse operation are provided in accordance with well known practice. The drive is so arranged that the threaded rods 20 rotate simultaneously and synchronously. Nuts 35 are threadedly mounted on the rods 20 and are formed with grooves 36 which receive tracks or guides 37 carried by horizontal members 38 of the supporting frame. Thus, the nuts 35, held against rotation by the interfitting relation of the keys or guide bars 37, are arranged to move in unison along the rods 20 during rotation of the latter.

Secured to one end of the movable mold section 10 is a cross member 41, the ends of which extend beyond the frame of the press 1 and are formed with recesses 42 which straddle the nuts 35, and the nuts 35 are formed with channels or saddles 43 which receive the ends of the members 41, so that movement of the nuts 35 along the rods 20 causes the member 41 to travel therewith and hence withdraw the mold section 10 out of the press or force the same back into the press. Since the screws or rods 20 have a common drive, they rotate in unison and the blocks or nuts 35 move simultaneously and at the same speed, thereby insuring accurate movement of the mold section 10 and preventing binding of the same in moving into and out of the press.

The bottom mold section 10, thus mounted on the tracks 12 for horizontal movement into and out of the press, is formed with recesses or cavities which are complemental to and cooperate with the recesses of the upper or stationary mold section 9 and have surfaces 44 to form the molding cavities A and to shape the outer surfaces of the face blanks being made. The number of cavities or recesses A provided in the mold sections is subject to variation. In the drawings is illustrated molding apparatus wherein the separable mold sections are formed to cooperatively provide eight cavities in which face blanks can be simultaneously shaped and cured. The cavity surfaces 11 and 44 are so shaped that with the additional molding elements and supplemental sections or pieces to be later described, face blanks are formed having curved cheek, chin, nose and forehead portions that join one another in continuous curves, the face blank being molded in partially flattened or collapsed position so that the cheek portions thereof are withdrawn from one another or bent outwardly in applying the mask to the face of the wearer.

In each of the molding cavities is disposed a core comprising a main core member 45 which is shaped to define the inside surfaces of the face blank. This core member is generally face shaped in curvature, having cheek, chin, nose and forehead portions all of which are curved and which are joined by continuous curved surface portions. Protrusions 46, Fig. 9, are provided to shape eye parts of the mask or face blank A. Each of the core members 45 includes a portion that extends above the forehead forming portion of the face blank and the core members are mounted by means of these extension portions for pivotal or turning movement on shafts 49 disposed in recesses in the bottom or movable mold section 10 and journalled in the latter. If desired, pairs of the core members may be mounted in back to back relation and secured by bolts 51 to a hinge portion 50 carried by the shaft 49.

It is customary to form face blanks for gas masks and similar devices with air inlet conduits that carry air drawn into the mask directly into the eye pieces or parts for the purpose of preventing condensation on the lenses. In accordance with the present invention these passages may be made during the molding or curing operation of the rubber mask by means of a yoke or core element of generally Y or wish-bone shape, formed of matching curved pieces 52 and 53, held together in predetermined fixed relation by means of a sleeve 54 which is telescopically or slidingly received on the juxtaposed semicylindrical ends of the elements 52 and 53.

As shown in Fig. 7, the yoke element is disposed so that the ends thereof straddle portion 55 of the core member 45 between the chin and nose portion of the latter and just beneath an extension 48 of the core which forms an exhalation passage in the face blank. The ends 56 of the yoke pieces 52 and 53 are received in recesses or slots 57 formed in the protrusions 46. The sleeve 54 is formed with an annular integral collar 58 centrally disposed relative thereto and which seats in a channel or groove 59 formed in the mold section 10 and a similar channel or groove (not shown) in the mold section 9, so as to accurately locate the yoke with respect to the cavity forming surfaces 11 and 47 of the mold sections and the surfaces of the core member 45.

Figure 5:
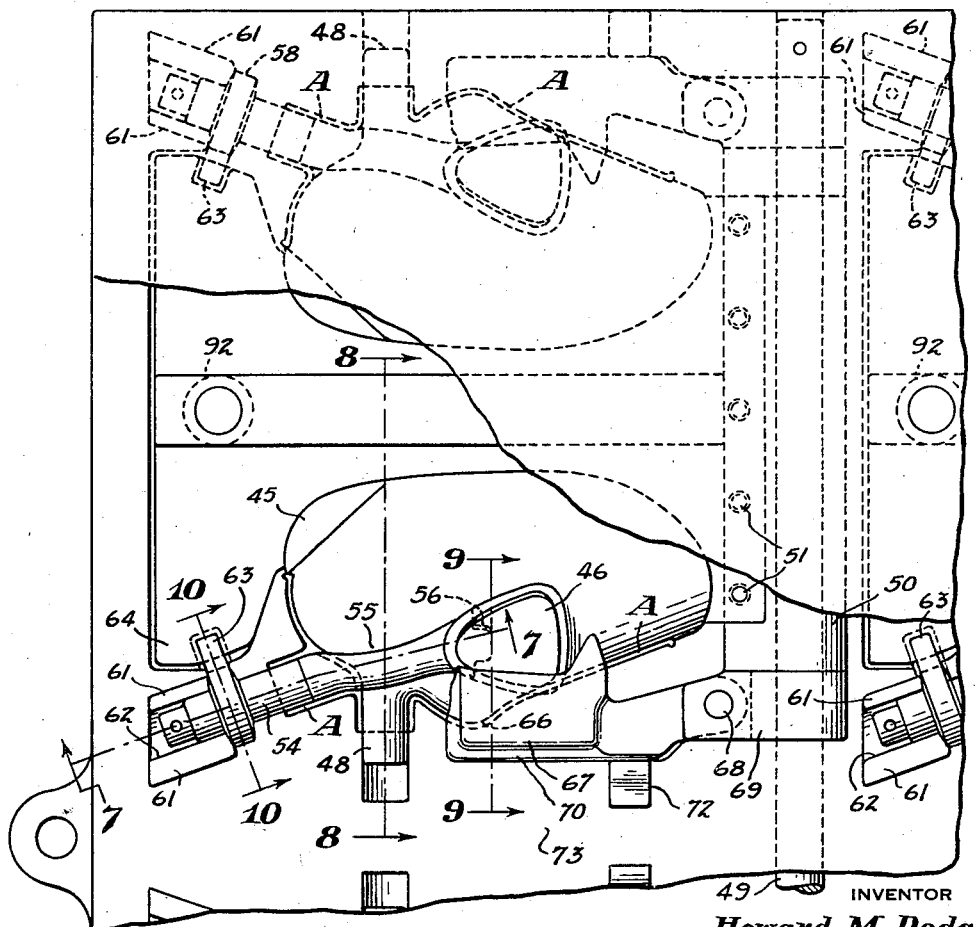
Fig. 5 is a fragmentary plan view with parts broken away showing parts of the mold sections, core members, yoke elements and supplemental core pieces.
Figure 11:
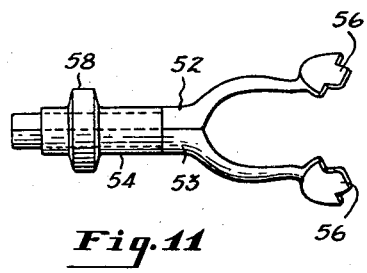
Fig. 11 is a detail showing the Y-shaped yoke element.

Preferably, the sides of the collar 58 are of conical form so that the collar is tapered and the sides of the channels 59 are of similar shape, so that the sleeve 54 may be progressively forced to proper position during the closing of the mold by the sliding of the collar into the channels. As shown in Figs. 5 and 7, the sleeve 54 abuts against shoulders 60 on the yoke elements 52 and 53 so that the yoke elements and the sleeve cooperatively provide a main air inlet passage in a tubular extension portion of the mask which is of uniform section or diameter. A pair of spaced upstanding portions or bosses 61 are formed on the bottom mold section 10 to provide therebetween a channel 62 which receives the sleeve 54 to guide the latter during the initial closing of the mold and before the collar 58 is received in the channel 59. Spaced ears 63 are formed on the sleeve collar 58 and extend laterally from the sleeve in parallel relation to one another, as shown in Fig. 10, to embrace an extension portion 64 of the core member 45. By this arrangement the yoke is supported at three points when the core member 45 is raised to the position shown in Fig. 6, two points of support being the yoke ends 56 received in the slots of the eye part protrusions, and the third point being the interlocking connection of the sleeve ears 63 with the portion 64 of the core member 45 at a point spaced below the chin portion of the core.

The cores 45 are formed with re-entrant curves 65 between the eye piece protrusions 46 and the nose portion 66. To cooperate with the re-entrant curves 65 of the core 45 and produce suitable grooves or undercut portions on the eye pieces of the face blanks, supplemental relatively small mold sections or pieces 67 are pivoted at 68 to ends 69 of the hinge members 50. As shown in Fig. 9, the supplemental core members 67 are of materially less width than the thickness of the portions of the core members 45 between the protrusions 46 and are wholly received within and between the mold sections 9 and 10 in suitable recesses formed therein. Preferably, the supplemental sections 67 are formed on the sides thereof away from the cavity A with bevel surfaces 70 which are engaged by cooperating bevel surfaces 71 of the recesses in the faces of the mold sections to progressively move the supplemental core members or sections toward the nose part of the mold core during closing of the mold. If desired, cams 72 may be provided to extend above the face 73 of the bottom mold section 10, such cams being formed with surfaces extending as continuations of the beveled surfaces 71 of the mold recesses to engage one of the surfaces 70 of each of the supplemental cores 67 and move the latter toward the core member 45 and into position during the closing of the mold to insure that the supplemental core member is received in the recesses in the mold faces, thereby avoiding engaging the supplemental member 67 in misplaced position between the mold sections, which would be apt to result in injury to the latter.

Means for simultaneously raising all of the core members 45 out of the cavity recesses 44 when the mold section 10 is withdrawn from the press is provided in the form of a plurality of rotatably mounted vertical threaded rods or screws 74. These rods are vertically reciprocable in guides 75 carried by horizontal frame members 76 which are supported by the uprights 16 and uprights 77. Suitable keys (not shown) are retained in the guides 75 and are slidably received in longitudinally extending grooves in the rods 74 to prevent turning of the rods in the guides. Supported on a plate or cross member 78, carried by the uprights 16 and 77, are housings 79 in which are journaled sleeves 80. These sleeves threadedly engage the rods 74 and are provided with suitable thrust bearing means so that rotation of the sleeves moves the rods 74 vertically in the guides 75. Sprockets 81 secured on the sleeves 80 externally of the housings 79 are engaged by a common drive belt or chain 82 actuated by a sprocket on a vertical shaft journalled in the plate 78 and having a ring gear 83 engaged by a bevel gear 84 of a speed reducer 85. A reversible electric motor 86 is drivingly connected to the speed reducer 85 and is provided with suitable controls so that at the will of the operator or otherwise, the sleeves 80 can be simultaneously rotated in a forward direction to raise all of the rods 74 in unison or rotated in a reverse direction to simultaneously lower all the rods 74 in unison.

Surmounting the upper ends of the rods 74 are pushers 89 pivoted to the rods at 90 and formed with spherical recesses 91 in their upper ends to receive spherical bearing members 92 secured to the underside of the cores 45. The sockets 91 and the spherical members 92 comprise universal pressure joints which allow relative universal pivoting of the pushers 89 relative to the core members. Vertical openings or passages 93 are formed in the movable mold section 10 in alignment with the bearing members 92 to receive the pushers 89 and threaded rods 74 when the latter are raised to free the core members 45 from the cavity recesses 44. On cross member 94 supported by the cross members 38 of the supplemental frame structure are secured sleeves 95 which guide the pushers 89. As shown in Fig. 1, the pushers may be entirely withdrawn below the plane of travel of the bottom mold section 10 to permit the latter to move into the press.

Figure 12:
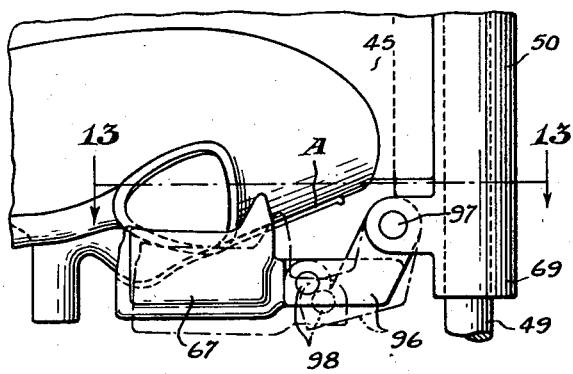
Fig. 12 is a fragmentary plan view similar to Fig. 5 showing a modification of the invention wherein the supplemental core piece is mounted for pivotal movement on a link pivotally connected to the main core member.
Figure 13:
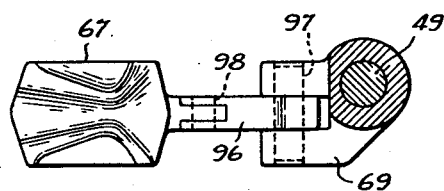
Fig. 13 is a sectional detail showing the supplemental core piece of Fig. 12 as the same would appear along the line indicated at 13—13 of Fig. 12.

In Figs. 12 and 13 is illustrated a modification of the invention wherein the supplemental mold section 67 is connected to the end 69 of the hinge member 50 by means of a link 96. The link 96 is pivoted to the end portion 69 of the hinge member by a pin 97 and is pivotally connected to the supplemental mold section 67 by a pin 98. The pins 97 and 98, like the pin 68, allow movement of the supplemental section 67 toward and away from the frontal portion of the core member 45 in the plane of the latter while preventing turning or pivotal movement of the supplemental section 67 relative to the core member 45 on the shaft 49. However, by the use of a pair of pivots in the modification shown in Figs. 12 and 13, the supplemental mold section 67 may be shifted bodily upwardly and away from the frontal portion of the core 45 as shown by the broken lines of Fig. 12. This arrangement wherein the supplemental sections 67 can be moved bodily, as distinguished from the pivotal movement of the structure previously described, facilitates freeing of the supplemental mold section from the re-entrant curved portions of the molded articles around the nose portion 66 of the core. As in the case of the embodiment first described, suitable means such as the cam 72 and the bevel surfaces 71 are provided for moving the supplemental mold section 67 into a correct position relative to the core 45 during closing of the mold when such supplemental section is mounted by the link as shown in Figs. 12 and 13.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. In apparatus for molding a face blank, separable mold sections each in one piece and having meeting faces shaped to cooperatively provide a cavity for forming external surfaces of the face blank, a core comprising a member shaped to form inside surfaces of the face blank, said member having protrusions on the sides thereof to form eye parts of the face blank, means for pivotally supporting one end of the core on one of the mold sections, a yoke element at the opposite end of the core having end portions straddling the member and connected to the protrusions and a stem portion extending beyond the member and means on the mold section to which the core is pivoted engageable with said stem portion to position the yoke element in the mold.

2. In apparatus for molding a face blank, separable mold sections having meeting faces shaped to cooperatively provide a cavity for forming external surfaces of the face blank, a core comprising a member shaped to form inside surfaces of the face blank, said member having protrusions on opposite side faces thereof to form eye parts of the face blank, and a supplemental section disposed between the mold sections and pivotally connected to the core member for movement laterally toward and away from an edge of the core member adjacent said protrusions, said supplemental section being shaped to cooperate with the mold sections to form that portion of the external surface of the face blank extending between said eye parts.

3. In apparatus for molding a face blank, separable mold sections having meeting faces shaped to cooperatively provide a cavity for forming external surfaces of the face blank, a core comprising a member in said cavity and shaped to form inside surfaces of the face blank, said member having protrusions on the sides thereof to form eye parts of the face blank, a supplemental section disposed wholly within the mold sections and means mounting the same for movement toward and away from that portion of the core member disposed between the protrusions, and means engageable with said supplemental section during the closing of the mold sections for moving the same toward the core member.

4. In apparatus for molding a rubber face mask or the like, a core member of face shape having curved cheek, chin, nose and forehead portions which join one another in continuous surface curves, and protrusions for forming hollow eye parts of the mask, separable mold sections having meeting faces recessed to cooperatively provide a cavity for the core member, means mounting the core for pivotal movement into and out of one of the mold section recesses, and a supplemental section and means mounting the same on the core for pivotal movement about an axis transverse to the pivotal axis of the core and toward and away from the nose portion of the core.

5. In apparatus for molding a rubber face mask or the like, a core member of face shape having curved cheek, chin, nose and forehead portions which join one another in continuous surface curves, and protrusions for forming hollow eye parts of the mask, separable mold sections having meeting faces recessed to cooperatively provide a cavity for the core member, means mounting the core for pivotal movement into and out of one of the mold section recesses, a supplemental section and means mounting the same on the core for pivotal movement toward and away from the nose portion of the core, said supplemental section being of less width than the cavity and being wholly received between and within the mold sections on either side of the plane of said meeting faces when the apparatus is assembled, and means on said one mold section for engaging and moving the supplemental section toward the nose portion of the core member during closing of the mold sections.

6. A face blank mold comprising a main core member having forming portions shaped to conform to the interior surfaces of the face blank, and a positioning portion extending from said forming portions, said forming portions having integral protrusions on the sides thereof to form eye parts of the face blank, a passage forming core member of Y shape, the arms of which straddle said forming portions of the main core member and connected at their ends to said protrusions and the stem portion of which is connected to the positioning portion of said main core member, the passage forming core member being spaced from the main core member except at the three points of connection thereto, and mold sections having recessed portions to receive the forming portions of the core, the positioning portion of the core and the stem of the passage forming core member.

7. A face blank mold comprising separable mold sections having opposed recessed faces shaped to form external surfaces of the face blank, a main core member having a portion shaped to form the inside surfaces of the face blank and having integral protrusions on the sides thereof to form eye parts of the face blank and portions extending from opposite ends of said shaped portion, a pivotal connection between one of said end portions of the core member and one of said mold sections, and a Y shaped passage forming core member having a stem and arms straddling the forming portion of said main core member, said arms being connected at their ends to said protuberances, and said stem being connected to the extending portion of the main core member remote from the pivotal connection, said arms and the inner portion of the stem being spaced from the main core member and from the recessed faces of said mold sections.

HOWARD M. DODGE.